(12) United States Patent
Azar et al.

(10) Patent No.: US 8,125,498 B2
(45) Date of Patent: Feb. 28, 2012

(54) GENERATING A 3D VOLUMETRIC MASK FROM A CLOSED SURFACE MESH

(75) Inventors: Fred S. Azar, Princeton, NJ (US); Benoit deRoquemaurel, Pennington, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 925 days.

(21) Appl. No.: 11/761,418

(22) Filed: Jun. 12, 2007

(65) Prior Publication Data
US 2008/0158253 A1 Jul. 3, 2008

Related U.S. Application Data

(60) Provisional application No. 60/878,490, filed on Jan. 3, 2007.

(51) Int. Cl.
*G09G 5/36* (2006.01)
(52) U.S. Cl. ........................................ 345/626
(58) Field of Classification Search .................. 345/626
See application file for complete search history.

(56) References Cited

U.S. PATENT DOCUMENTS

| | | | | |
|---|---|---|---|---|
| 5,179,638 A * | 1/1993 | Dawson et al. | ............... | 345/582 |
| 5,592,597 A * | 1/1997 | Kiss | ............... | 345/419 |
| 5,687,304 A * | 11/1997 | Kiss | ............... | 345/419 |
| 5,839,440 A * | 11/1998 | Liou et al. | ............... | 600/431 |
| 6,154,518 A * | 11/2000 | Gupta | ............... | 378/62 |
| 6,459,429 B1 * | 10/2002 | Deering | ............... | 345/423 |
| 6,559,842 B1 * | 5/2003 | Deering et al. | ............... | 345/420 |
| 6,628,277 B1 * | 9/2003 | Deering et al. | ............... | 345/419 |
| 6,704,018 B1 * | 3/2004 | Mori et al. | ............... | 345/502 |
| 6,982,710 B2 * | 1/2006 | Salomie | ............... | 345/420 |
| 7,071,935 B1 * | 7/2006 | Deering et al. | ............... | 345/419 |
| 7,088,362 B2 * | 8/2006 | Mori et al. | ............... | 345/423 |
| 7,343,039 B2 * | 3/2008 | Liu et al. | ............... | 382/170 |
| 7,450,124 B2 * | 11/2008 | Burch et al. | ............... | 345/427 |
| 7,538,764 B2 * | 5/2009 | Salomie | ............... | 345/420 |
| 2004/0104915 A1 * | 6/2004 | Mori et al. | ............... | 345/561 |
| 2004/0186631 A1 * | 9/2004 | Ohta | ............... | 700/303 |
| 2006/0094951 A1 * | 5/2006 | Dean et al. | ............... | 600/407 |
| 2006/0147492 A1 * | 7/2006 | Hunter et al. | ............... | 424/426 |
| 2006/0209061 A1 * | 9/2006 | Burch et al. | ............... | 345/419 |
| 2006/0290695 A1 * | 12/2006 | Salomie | ............... | 345/420 |
| 2008/0079722 A1 * | 4/2008 | Burns et al. | ............... | 345/424 |
| 2009/0102844 A1 * | 4/2009 | Deparis | ............... | 345/426 |

OTHER PUBLICATIONS

A method for interactive manipulation and animation of volumetric data Yves Jean, Larry F. Hodges Graphics, Visualization and Usability Center College of Computing Georgia Institute of Technology Atlanta, GA 30332 Roderic Pettigrew, 1992.*

* cited by examiner

*Primary Examiner* — Javid A Amini
(74) *Attorney, Agent, or Firm* — Donal B. Paschburg; F. Chau & Associates, LLC

(57) ABSTRACT

A computer readable medium is provided embodying instructions executable by a processor to perform a method for generating a volumetric mask. The method includes providing a closed surface mesh, determining a discrete volume representation of the closed surface mesh, determining a temporary surface mask based on the closed surface mesh and a slice direction chosen from the discrete volume representation to produce a contour of the closed surface mesh for each slice of the discrete volume representation, and filling a surface defined by the contours to generate the volumetric mask.

12 Claims, 4 Drawing Sheets

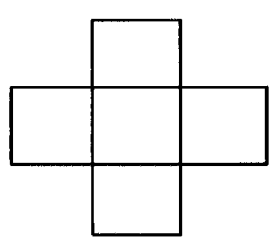 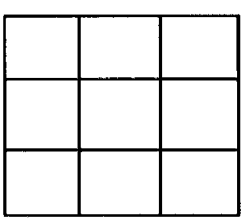 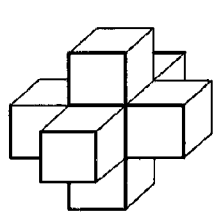 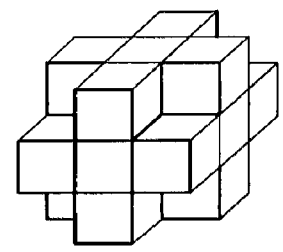
FIG. 1A  FIG. 1B  FIG. 1C  FIG. 1D
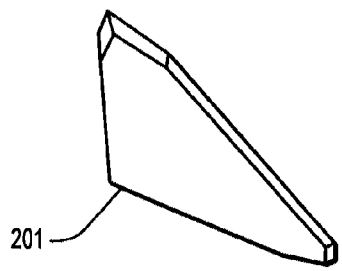
FIG. 2
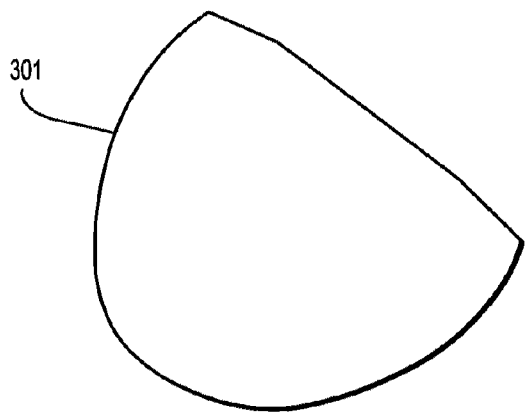 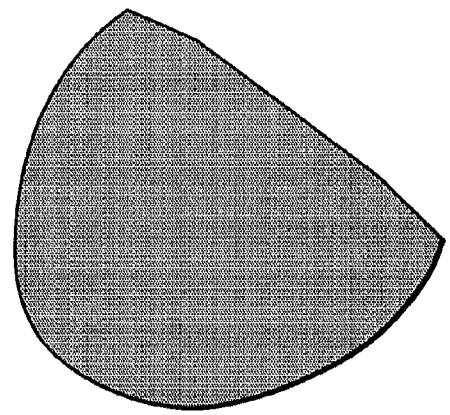
FIG. 3A  FIG. 3B

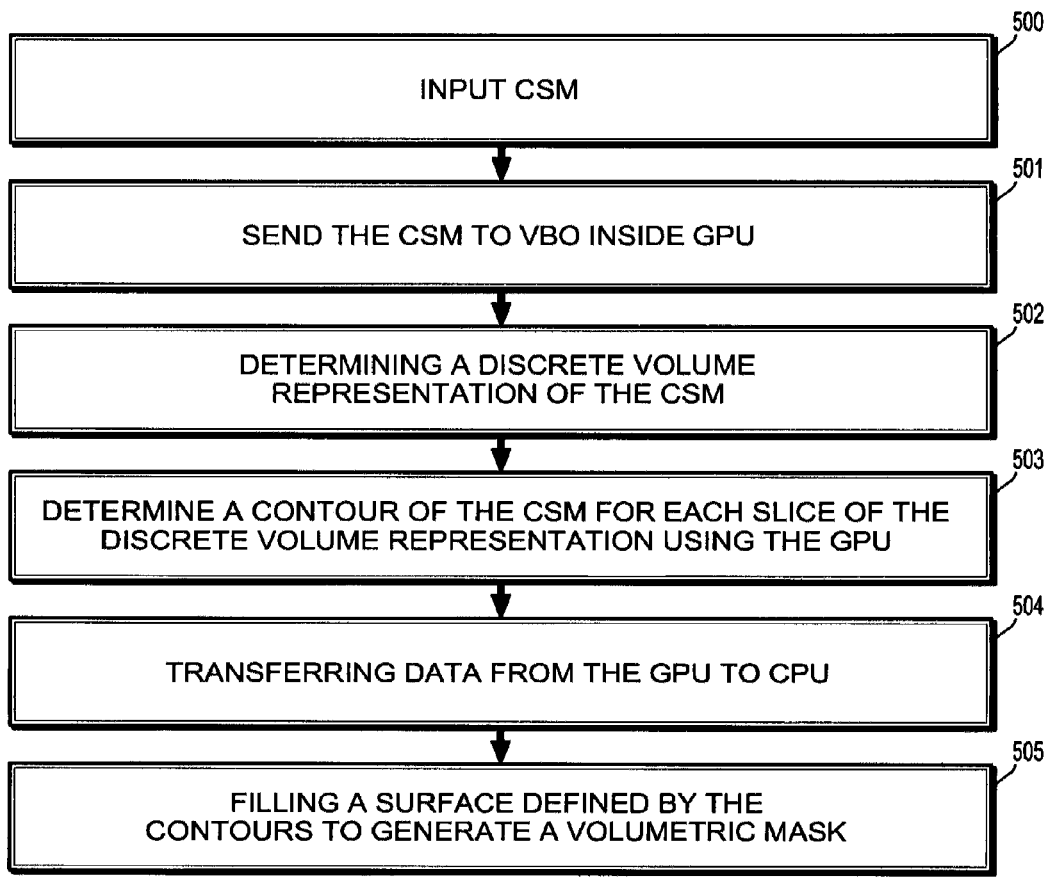
FIG. 5A
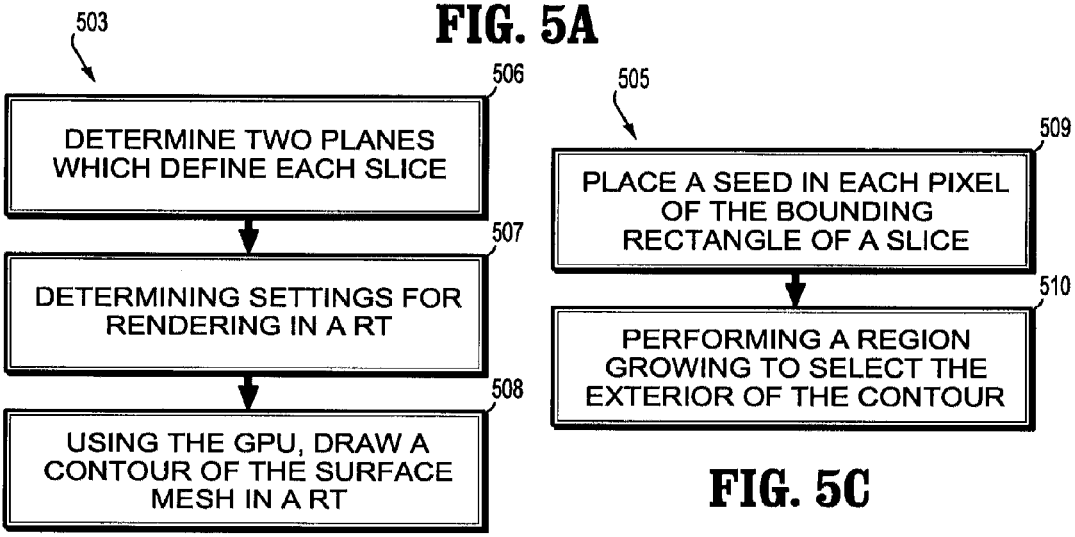
FIG. 5B
FIG. 5C

US 8,125,498 B2

GENERATING A 3D VOLUMETRIC MASK FROM A CLOSED SURFACE MESH

CROSS-REFERENCE TO RELATED APPLICATION

This application claims priority to U.S. Provisional Application Ser. No. 60/878,490, filed on Jan. 3, 2007, which is herein incorporated by reference in its entirety.

BACKGROUND OF THE INVENTION

1. Technical Field

The present invention relates to image rendering, and more particularly to a system and method for generating a 3D volumetric mask.

2. Discussion of Related Art

Methods for generating a 2D image from volumetric data can be classified as indirect and direct volume rendering techniques. Indirect methods generate and render an intermediate representation of the volume data, while direct methods display voxel data by evaluating an optical model, which describes how the volume emits, reflects, scatters, absorbs, and occludes light. Voxel densities are mapped to physical quantities describing light interaction at respective points in a 3D-space. During image synthesis, light propagation is computed by integrating light interaction effects along viewing rays based on an optical model. The corresponding integral is known as the volume rendering integral.

Digital surfaces are represented by sets of polygons (e.g., triangles or quadrilaterals). These surfaces may be arbitrarily generated, obtained from the segmentation of a three-dimensional (3D) image (medical or non-medical), or obtained from a 3D point cloud. These points may be acquired from real-life objects, using point trackers, such as optical or magnetic based trackers.

The 3D volume array of data, typically used in volume rendering, is assembled using a series of consecutive slices through a solid body being scanned, where each slice is a two-dimensional (2D) image array of data points. Each grid value of a 2D image array is called a picture element, or pixel, while each grid value of a 3D volume array is called a volume element, or voxel. The 3D volumetric information can also be obtained by other means such as Computed Tomography (CT), Diffuse Optical Spectroscopy (DOS), positron emission tomography (PET), ultrasound scanning, etc.

A surface of the 3D volumetric array may need to be filled in with information, and therefore a volume needs to be generated from the surface. Each voxel inside the volume may be given a specific quantitative value.

To be able to fill the surface of the 3D volumetric array it is important to be able to combine and merge multimodal information such as geometric information from surfaces and other types of volumetric data.

The amount of data involved in the DVR increases with the volume dimensionality.

Therefore, a need exists for an efficient algorithm for volumetric rendering, which can be used in a variety of cases.

SUMMARY OF THE INVENTION

According to an embodiment of the present disclosure, a computer readable medium is provided embodying instructions executable by a processor to perform a method for generating a volumetric mask. The method includes providing a closed surface mesh, determining a discrete volume representation of the closed surface mesh, determining a temporary surface mask based on the closed surface mesh and a slice direction chosen from the discrete volume representation to produce a contour of the closed surface mesh for each slice of the discrete volume representation, and filling a surface defined by the contours to generate the volumetric mask.

According to an embodiment of the present disclosure, a computer system for generating a volumetric mask, the system including a memory device storing a closed surface mesh, and a processor in communication with the memory device, the processor for reading the closed surface mesh from the memory device, determining a discrete volume representation of the closed surface mesh, determining a temporary surface mask based on the closed surface mesh and a slice direction chosen from the discrete volume representation to produce a contour of the closed surface mesh for each slice of the discrete volume representation, and filling a surface defined by the contours to generate the volumetric mask.

BRIEF DESCRIPTION OF THE DRAWINGS

Preferred embodiments of the present invention will be described below in more detail, with reference to the accompanying drawings:

FIGS. 1A-B is an illustration of exemplary neighborhood systems in 2D for 4- and 8-connexity, respectively, according to an embodiment of the present disclosure;

FIGS. 1C-D is an illustration of exemplary neighborhood system in 3D for 6- and 18-connexity, respectively, according to an embodiment of the present disclosure;

FIG. 2 is an illustration of edges of clipped polygons in the RT, showing interstitial space according to an embodiment of the present disclosure;

FIG. 3A is an illustration of the creation of a slice according to an embodiment of the present disclosure;

FIG. 3B is an illustration of filling in slice according to an embodiment of the present disclosure;

FIG. 5A is a flow chart of a method for generating a volumetric mask according to an embodiment of the present disclosure;

FIG. 5B is a flow chart of a method for determining a temporary surface mask according to an embodiment of the present disclosure;

FIG. 5C is a flow chart of a method for filling a surface of a mask according to an embodiment of the present disclosure.

DETAILED DESCRIPTION OF EXEMPLARY EMBODIMENTS

Figure 4A:
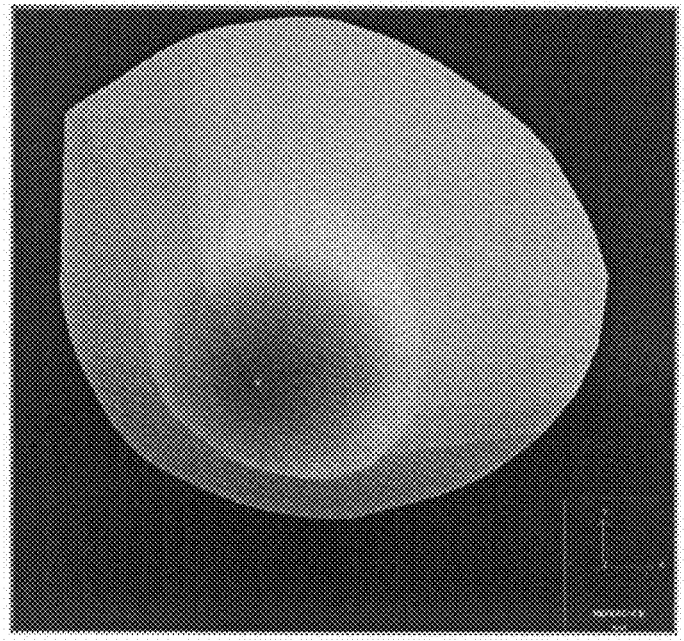
FIG. 4A is an example of a surface mesh according to an embodiment of the present disclosure.

According to an embodiment of the present disclosure, a volumetric mask is generated from a closed surface mesh using a graphics card's parallel computational power.

Terms & Acronyms

Facets: A facet is a convex planar polygon defined by a set of points.

Surface Mesh: A surface mesh is a set of facets. Facets are stored as set of points and of n-uples: an n-uple defines a polygon with the corresponding points. Two polygons can only intersect on a point or on an entire edge.

Closed Surface mesh (CSM): A surface mesh is said closed if one can distinguish points inside the polyhedral from points outside.

Voxels: A voxel is a unity of discretized volume: a voxel is a parallelepiped characterized by the length and direction of three mutually orthogonal edges. It is the 3D equivalent of a pixel in 2D.

Discrete Volume Representation (DVR): A DVR is a set of voxels having the same lengths and directions contained in a rectangular 'box' whose sides are aligned with the voxel sides along the 3 principal mutually orthogonal directions (e.g. x,y,z orthonormal basis).

Slice: A slice is all the voxels of a DVR that make up a plane whose orthogonal vector points in one of the 3 main directions. A DVR can also be thought as a set of slices.

Mask: A mask is an array of values, for example {0, 1}, which usually describes a logical property of a DVR: for example, it could be 1 if a voxel is inside a closed surface mesh and 0 otherwise.

Volumetric information: Similar to a mask but for any kind and range of values.

Region Growing Operation: Region Growing Operation is an image segmentation technique which deals with morphological operations.

OpenGL: Open Graphic Library is a standard specification for writing applications that produces 2 or 3D graphics.

GPU: Graphic Processor Unit.

P-Buffer or Render Texture (RT): RT is a buffer in GPU memory that can be used both in reading and writing. Texture Buffer is like an off-line screen where scenes can be rendered.

Vertex Buffer Object (VBO): A VBO is a vertex buffer in GPU. The use of VBO decreases data transfer between CPU and GPU and then accelerates the display speed.

Referring to FIG. 5A, a method for generating a volumetric mask from a closed surface mesh 500 includes sending a CSM to the VBO inside the GPU 501, determining a DVR 502 of the closed surface mesh, and determining a temporary surface mask 503 to produce a contour of the closed surface mesh for each slice on the RT. The determination of the DVR 502 and temporary surface mask 503 are performed by a parallel processor such as a GPU. The method includes transferring data from the GPU to the CPU 504 if a GPU is implemented, and filling a surface defined by the contours to generate a volumetric mask 505.

To define the inside and outside of a surface, a neighborhood system is used to define connected components (FIGS. 1A-B show 2D examples of neighborhood systems while FIGS. 1C-D show 3D examples). FIGS. 1A-B show neighborhood systems in 2D for 4- and 8-connexity, respectively. FIGS. 1C-D show neighborhood systems in 3D for 6- and 18-connexity, respectively.

Returning to the determination of the DVR 502, DVR parameters are defined, including orientation, minimum and maximum position and range of volume. In the following, 3 directions of the volume will be favored. One has to choose appropriate directions if possible. The minimum and maximum position of the mesh can be determined based on minimum and maximum position on the points of the mesh. A bounding box is thus generated. A number of voxels along the 3 axes is also important since computation time depends on it.

Referring to the determination of the temporary surface mark 503 and FIG. 5B; voxels that belong to the closed surface mesh are determined by choosing a slice direction in the DVR (for example, slices orthogonal to the z-axis). For every slice, the two planes which define the slice are determined and associate a clipping plane to each of the two planes 506. The appropriate settings for rendering in a RT are determined 507, including those for enabling additional clipping planes, disabling anti-aliasing filters, and setting the line width to 1. Clipping and rasterizing operations are used to draw a contour of the surface mesh between the two clipping planes (see FIG. 3A showing the creation of a slice 301), in an RT 508. This operation includes two steps: displaying edges of the clipped polygons, in the RT: (OpenGL command glPolygonMode(GL_FRONT_AND_BACK, GL_FILL)), and filling-in the interstitial space inside resulting edges 201 (see FIG. 2): (OpenGL command glPolygonMode (GL_FRONT_AND_BACK, GL_LINE)). The result is a contour of the closed surface mesh for each slice on the RT. FIG. 2 shows edges 201 of clipped polygons in the RT, showing interstitial space.

Referring to the transfer data from GPU to CPU 504, each voxel contour in RT is brought back to an array of CPU memory for each slice (OpenGL command glReadPixel). The result is a contour of the closed surface mesh for each slice in an array.

Here, for example, a computer graphics card may be considered in as a parallel processor for sharing processing load and increasing the computation speed. Some libraries such as OpenGL and their extensions can provide efficient means of taking advantage of a graphics card's computational power.

Referring to the filing of the mask of surface 505, the inside of all the resulting contours is filled using a 2D approach (slice approach) or 3D approach (e.g., filling directly the 3D contour).

Figure 4B:
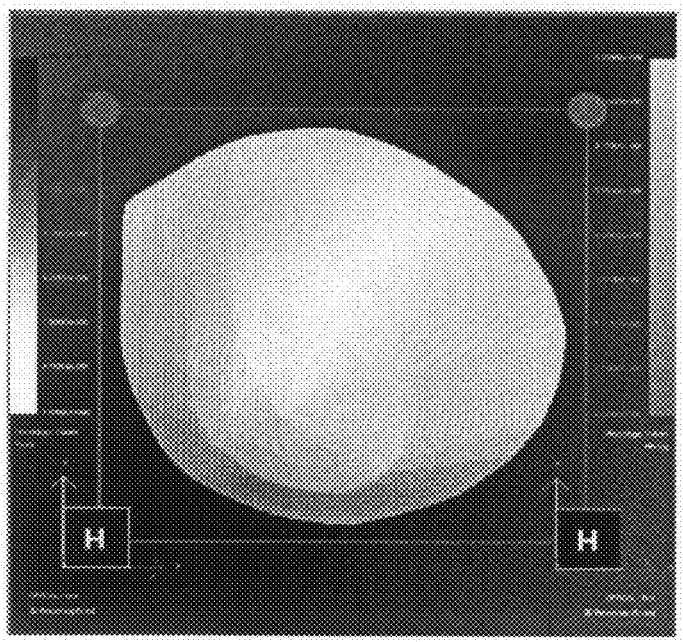
FIG. 4B is a volume display of the 256×256×256 corresponding discrete volume according to an embodiment of the present disclosure.

Referring to FIG. 5C, for the 2D approach, for each slice, a seed is placed in each pixel of the bounding rectangle of a slice 509 (all seeds then lie outside the contour), and a region growing operation is performed to select the exterior of the contour 510 (see FIG. 3B showing a filled slice). The result is the final mask of the volume enclosed in the initial surface mesh (see FIG. 4A showing an example of a surface mesh, and FIG. 4B showing a volume display of the 256×256×256 corresponding discrete volume).

To accelerate rendering of the contour of the surface mesh between the two clipping planes, VBO may be used to display the closed surface mesh.

Sample computation time results are given in Table 1. Table 1 shows result and allocation of time for each step of the workflow. Slice filling is the most time-consuming operation. A more efficient method may be implemented either by filling directly the 3D volume or either by filling slices in GPU.

TABLE 1

| Number of voxels | Total Time | Display time Create slices | Load time GPU to CPU | Fill Time |
|---|---|---|---|---|
| 64 × 64 × 64 | 0.380 | 0.190 | 0.120 | 0.070 |
| 128 × 128 × 128 | 0.721 | 0.380 | 0.030 | 0.311 |
| 256 × 256 × 256 | 3.244 | 0.720 | 0.160 | 2.364 |

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 6:
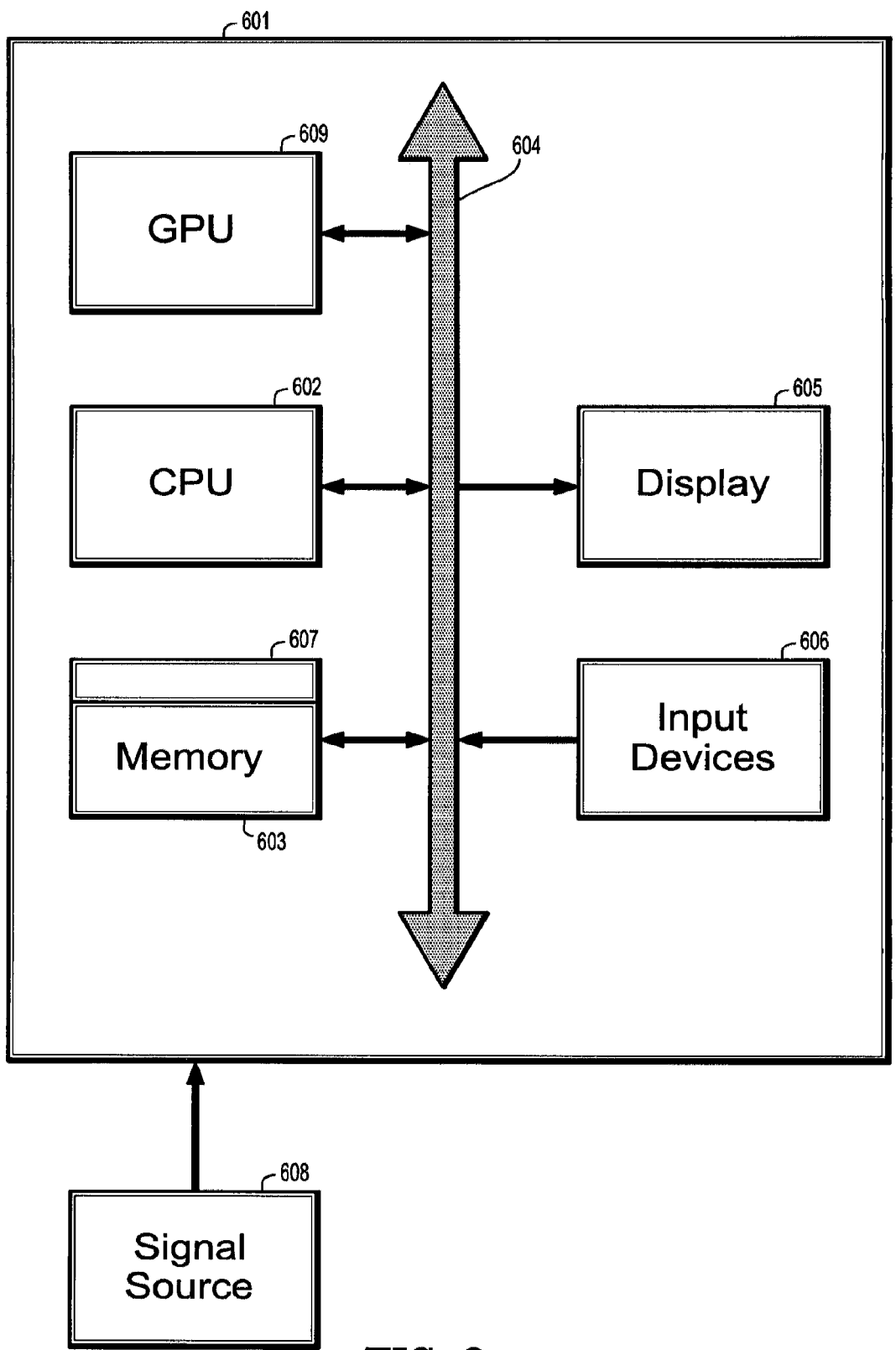
FIG. 6 is a diagram of a system according to an embodiment of the present disclosure.

Referring to FIG. 6, according to an embodiment of the present invention, a computer system 601 for generating a volumetric mask can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process a signal, e.g., a closed surface mesh, from the signal source 608. As such, the computer system 601 is a general purpose computer system that becomes a specific purpose computer system when executing the routine 607 of the present invention. The computer system 601 may further include a GPU 609 for processing certain operations.

The computer platform 601 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for generating a volumetric mask, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying instructions executable by a processor to perform a method for generating a volumetric mask, the method comprising:
   providing a closed surface mesh;
   determining a discrete volume representation of the closed surface mesh;
   determining a temporary surface mask based on the closed surface mesh and a slice direction chosen from the discrete volume representation to produce a contour of the closed surface mesh for each slice of the discrete volume representation; and
   filling a surface defined by the contours to generate the volumetric mask, wherein the volumetric mask is output to one of a display and a memory, wherein determining of the temporary surface mask comprises, determining two planes which define each slice and associate a clipping plane to each of the two planes;
   setting up a rendering in a render texture for enabling the two clipping planes; and
   drawing the contour of the surface mesh between the two clipping planes, wherein filling the surface defined by the contours to generate the volumetric mask comprises filling using one of a 2D approach and a 3D approach filling directly the contours, wherein the 2D approach comprises: placing a seed in each pixel of the bounding rectangle of each slice; and
   performing a region growing operation to select an exterior of the contour.

2. The method of claim 1, wherein determining the discrete volume representation includes defining parameters including orientation, minimum and maximum position and range of a volume of the closed surface mesh.

3. The method of claim 1, wherein
   setting up the rendering in the render texture further comprises disabling anti-aliasing filters, and setting the line width.

4. The method of claim 1, wherein drawing the contour of the surface mesh between the two clipping planes comprises:
   displaying edges of the clipped polygons, in the render texture; and
   filling an interstitial space inside resulting edges.

5. The method of claim 1, wherein providing the closed surface mesh includes providing the closed surface mesh to a parallel processor other than a central processing unit, the method further comprising transferring data including the contours of the closed surface mesh for each slice of the discrete volume representation from the parallel processor to the central processor to build an array comprising each slice.

6. The method of claim 5, wherein the parallel processor comprises a vertex buffer object for communicating with the central processor.

7. A computer system for generating a volumetric mask, the system comprising:
   a memory device storing a closed surface mesh; and
   a processor in communication with the memory device, the processor for reading the closed surface mesh from the memory device, determining a discrete volume representation of the closed surface mesh, determining a temporary surface mask based on the closed surface mesh and a slice direction chosen from the discrete volume representation to produce a contour of the closed surface mesh for each slice of the discrete volume representation, and filling a surface defined by the contours to generate the volumetric mask, wherein determining of the temporary surface mask comprises determining two planes which define each slice and associate a clipping plane to each of the two planes;
   setting up a rendering in a render texture for enabling the two clipping planes; and
   drawing the contour of the surface mesh between the two clipping planes, wherein filling the surface defined by the contours to generate the volumetric mask comprises filling using one of a 2D approach and a 3D approach filling directly the contours, wherein the 2D approach comprises: placing a seed in each pixel of the bounding rectangle of each slice; and
   performing a region growing operation to select an exterior of the contour.

8. The system of claim 7, further comprising a parallel processor in communication with the processor, the parallel processor for receiving the closed contour mesh from the processor and determining the temporary surface mask based on the closed surface mesh and the slice direction chosen from the discrete volume representation to produce the contour of the closed surface mesh for each slice of the discrete volume representation, wherein the parallel processor returns the contours to the processor.

9. The system of claim 8, wherein the parallel processor comprises a vertex buffer object.

10. The system of claim 8, wherein the parallel processor is a graphic processor unit.

11. The system of claim 7, comprising a display for displaying the volumetric mask.

12. The system of claim 7, comprising a memory for storing the volumetric mask.

* * * * *